United States Patent  
Jacobson et al.

(10) Patent No.: US 8,788,750 B2
(45) Date of Patent: Jul. 22, 2014

(54) MANAGING RESOURCES IN CLUSTER STORAGE SYSTEMS

(75) Inventors: Michael B. Jacobson, Boise, ID (US); Douglas L. Voigt, Boise, ID (US); Ronald D. Rodriguez, Boise, ID (US); Brian L. Patterson, Boise, ID (US); Randy Matthews, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1832 days.

(21) Appl. No.: 11/796,679

(22) Filed: Apr. 27, 2007

(65) Prior Publication Data

US 2008/0270693 A1    Oct. 30, 2008

(51) Int. Cl.
*G06F 12/00*    (2006.01)
(52) U.S. Cl.
USPC .................................. 711/114; 711/E12.001
(58) Field of Classification Search
None
See application file for complete search history.

(56) References Cited

U.S. PATENT DOCUMENTS

| | | | |
|---|---|---|---|
| 6,343,324 B1 * | 1/2002 | Hubis et al. | 709/229 |
| 7,328,260 B1 * | 2/2008 | Muthiyan et al. | 709/224 |
| 7,363,535 B2 * | 4/2008 | Taguchi | 714/13 |
| 7,437,753 B2 * | 10/2008 | Nahum | 726/4 |
| 2004/0030855 A1 * | 2/2004 | Takeuchi et al. | 711/170 |
| 2005/0050270 A1 * | 3/2005 | Horn et al. | 711/114 |
| 2005/0188161 A1 * | 8/2005 | Taguchi | 711/152 |
| 2007/0079092 A1 * | 4/2007 | Hara et al. | 711/163 |
| 2007/0094449 A1 * | 4/2007 | Allison et al. | 711/119 |
| 2007/0094655 A1 * | 4/2007 | Rostampour | 717/168 |
| 2007/0168609 A1 * | 7/2007 | Ali | 711/114 |
| 2008/0114951 A1 * | 5/2008 | Lee | 711/162 |

* cited by examiner

*Primary Examiner* — Charles Rones
*Assistant Examiner* — Ryan Dare

(57) ABSTRACT

Embodiments include methods, apparatus, and systems for managing resources in a storage system. One embodiment includes a method that discovers storage resources for arrays in a cluster storage system. A table defines how the resources are divided among the arrays and is provided to the arrays so each array can identify which resources to manage.

18 Claims, 3 Drawing Sheets

MANAGING RESOURCES IN CLUSTER STORAGE SYSTEMS

BACKGROUND

Enterprises commonly maintain multiple copies of important data and expend large amounts of time and money to protect this data against losses due to disasters or catastrophes. In some storage systems, data is stored across numerous disks that are grouped together. These groups can be linked with arrays to form clusters having a large number of individual disks.

In cluster storage systems, numerous controllers exist on the network. Problems can occur when controllers have visibility to resources, such as array definition metadata, that do not belong to the array to which the controller is a member. If the controllers are not properly managed, then algorithms in their internal firmware can cause inconsistencies, confusion, and data loss.

Regardless of the backup or data transfer techniques being used, enterprises can lose valuable time and money when storage arrays are taken offline or shutdown. In these situations, applications are shutdown, storage devices are disconnected and reconnected, LUNs (logical unit numbers) are re-mapped, etc. While the storage arrays are offline, operation of the enterprise is disrupted and jeopardized.

DETAILED DESCRIPTION

Embodiments are directed to apparatus, systems, and methods to control access to shared resources in a clustered storage system. In one embodiment, algorithms in array firmware are provided with a configuration table in order to prevent conflicts in the clustered storage system. In one embodiment, a single new layer of firmware is added that presents only the resources allocated to each array to that instance of the array firmware. As such, the need for extensive modification of the array firmware algorithms is avoided.

One embodiment includes a clustered array storage architecture in which multiple individual array storage systems are configured from a pool of shared resources that are accessible on a common network. The shared resources include disks, disk shelves, and network infrastructure components. Each individual array comprises one or more array controllers and a subset of the shared resources. The cluster architecture provides the ability to move access to the shared resources between arrays to provide performance and capacity scaling, load balancing, data movement, and other useful features that cannot be obtained directly from a group of independent arrays. An additional layer in the operating firmware of the array controllers provides for the specification and recognition of shared resources allocated to each array so the arrays do not conflict in the sharing process. Reconfiguration of the specification by an outside cluster management entity is used to cause the movement of access to shared resources between arrays.

Figure 1:
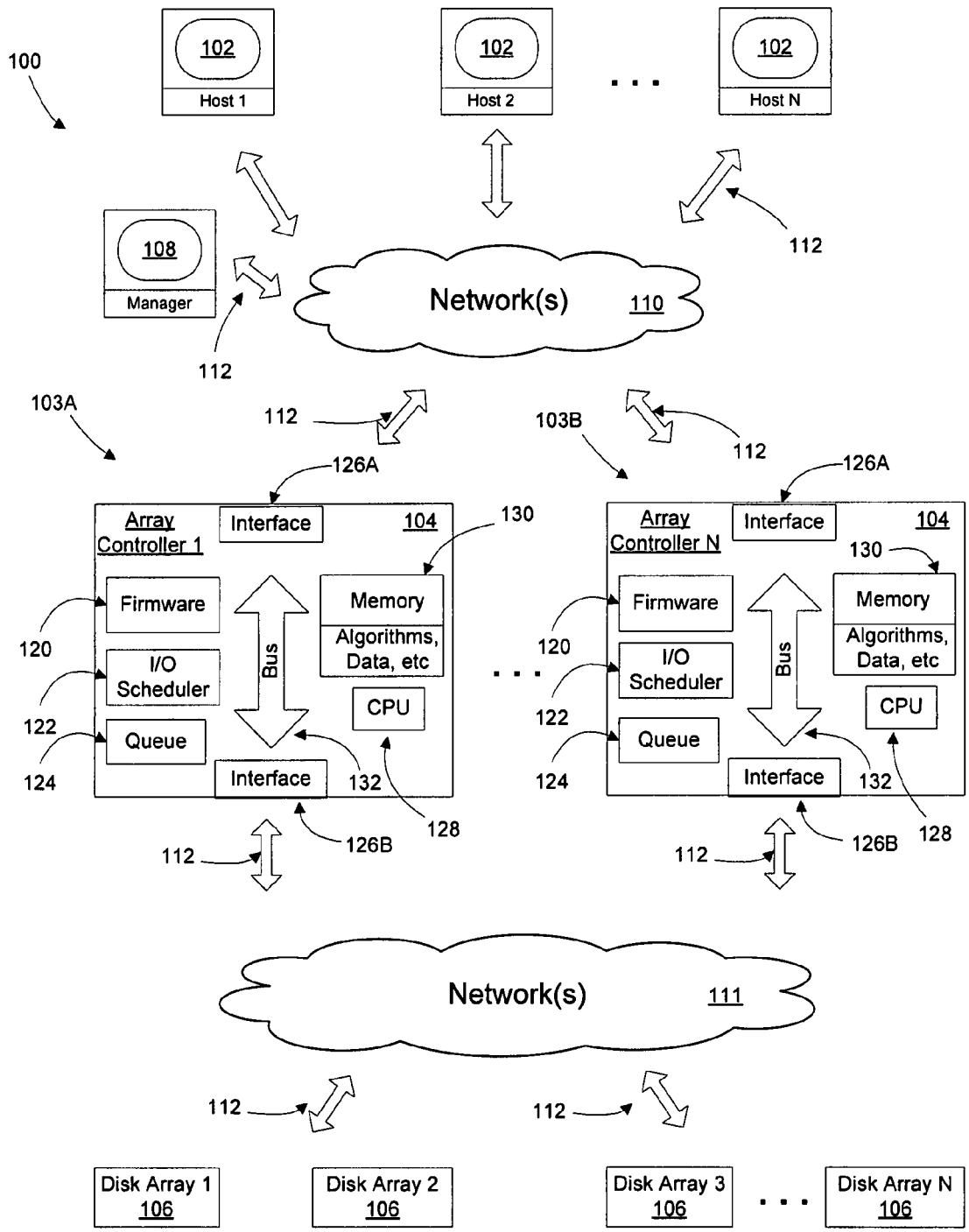
FIG. 1 is a block diagram of a cluster storage system in accordance with an exemplary embodiment of the present invention.

One embodiment uses zones on the back end network (see FIG. 1 at network(s) 111) to limit the visibility of resources to controllers. The resources of each array, including the controllers, are contained in their own network zone. There is also a need for all controllers to see each other so they can communicate with each other for certain cluster operations so there is a separate zone containing only the controllers. The cluster is configured and cluster operations are carried out by configuration and management of the zones. For example, to transfer a disk group between arrays, the disks are removed from the zone of the source array and placed into the zone of the target array. Fiber channel switched fabric is an example of a network technology that can be used for a back end clustering network that supports the zoning functionality.

In one embodiment, it is not necessary to construct or have an actual physical network capable of zoning. Rather, the embodiment implements a logical zoning capability in the controller firmware.

In one embodiment, a cluster configuration layer is placed in the firmware between the back end network discovery process and the rest of the firmware. The cluster configuration layer uses a cluster configuration table to determine which of the discovered back end network resources will be presented by discovery to the rest of the firmware. The cluster configuration table for the entire cluster is constructed by management software with user interaction during cluster configuration or reconfiguration processes and communicated to the firmware. The cluster configuration layer in each array of a cluster recognizes its own entries in the cluster configuration table and behaves accordingly. With the proper cluster configuration table in place in each array of a cluster, the arrays behave as if their back end networks were physically separate or isolated.

In one embodiment, a class of objects called the disk group is the unit of data storage whose access or control is managed between arrays in the cluster. A disk group comprises two or more physical data storage disks and the definition of a set of logical disks that are the host visible storage containers. The logical disks are virtual objects that use the physical disks as a backing store for the host data.

FIG. 1 is a block diagram of an exemplary distributed file or storage system 100 in accordance with an exemplary embodiment of the invention. By way of example, the system is a cluster storage network and/or a storage area network (SAN) that includes a plurality of host computers 102 and one or more storage devices or arrays 103A, 103B that include one or more storage controllers 104 (shown by way of example as an array controller), a plurality of storage devices 106 (shown by way of example as disk array 1 to disk array N), and a manager 108 in communication with the storage controllers and devices.

The host computers 102 (shown as host 1 to host N) and manager 108 are coupled to the array controllers 104 through one or more fabrics or networks 110, and the storage devices or arrays 103 are coupled to the storage devices 106 through one or more fabrics or networks 111. For instance, the hosts communicate with an array controller using a small computer system interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment the storage devices 103A, 103B are disk arrays. Each disk array can have one or more controllers. For instance, an array has two controllers for redundancy.

In one embodiment, storage devices 103A, 103B are physically located in a same data center. In another embodiment, the storage devices are located a great geographical distance apart in separate data centers. Further, although only two storage devices are shown, a SAN can include hundreds or thousands of such storage devices.

Figure 2:
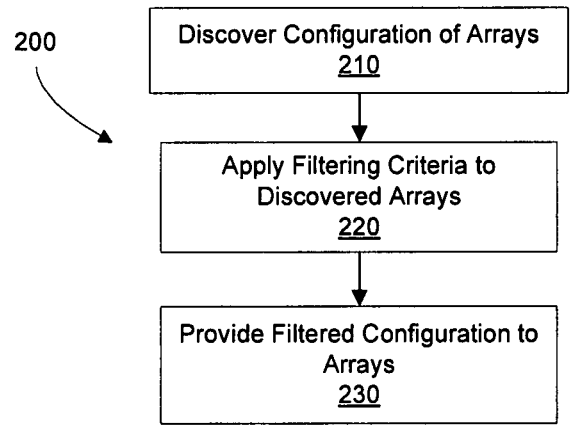
FIG. 2 is a flow diagram for providing filtered configuration to storage devices in accordance with an exemplary embodiment of the present invention.

FIG. 2 is a flow diagram 200 for providing filtered configuration to storage devices in accordance with an exemplary embodiment of the present invention.

According to block 210, the cluster configuration of the arrays is discovered. By way of example, a discovery layer in the firmware of a controller probes the backend network and creates a database in the array controller of the discovered resources, such as disks, shelves, arrays, etc. A single array can be designated to discover resources, or multiple arrays can be designated for such discovery.

According to block 220, filtering criteria are applied to the discovered resources. The filtering criteria limit the resources that are provided to each array. For instance, each array only sees the resources designated per the filtering criteria. In one embodiment, the filtering criteria define how the discovered resources are divided among the arrays.

According to block 230, the filtered configurations are provided to the arrays. In one embodiment, each array only receives a portion of or rights to the discovered resources. For instance, each array controller only receives a filtered view of the entire discovered resources. As such, each array algorithm is not required to be modified to be knowledgeable of the entire cluster configuration.

In one embodiment, the array management software builds a cluster table that determines which resources each array sees in the cluster system. The cluster table defines ownership of resources between the arrays. Only certain resources are assigned to each array and then made visible to the firmware of the array. Resources not assigned to an array are hidden and not made visible to the firmware of the array.

By way of illustration, the table below shows a cluster configuration table wherein different resources are assigned to each of the arrays. By way of example, the resources are defined using a unique identifier, such as a world wide name (WWN).

| Configuration Table | |
| --- | --- |
| Array Name | Resources Owned By Array |
| Array 1 | WWN 1, WWN2, WWN 3 |
| Array 2 | WWN5, WWN6, WWN8, WWN9 |
| . . . | . . . |
| Array Nth | WWNs |

In one embodiment, each array is only provided with its resources. Thus, array 1 is provided with WWN1, WWN2, and WWN3 since these resources are managed by array 1. Array 1 would not have access to or knowledge of the resources of other arrays.

In one embodiment, each array only receives information pertaining to its own resources. In another embodiment, each array receives all information pertaining to all resources in the cluster. For instance, array 1 in the table would receive the list of WWNs for array 2, array 3, etc. Resources not designated to a particular array are marked (example, flagged) so the firmware algorithm can determine or recognize between its resources and the resources of another array. For instance, since array 1 has knowledge of the resources of array 2, array 1 could receive instructions from the manager to operate on resources of array 2. The manager can thus selectively choose on which resources an array operates. By way of example, firmware in array 1 is modified so it can read information owned by array 2 during a transfer of ownership.

In one embodiment, the firmware is functionally partitioned into one or more of (1) discovery layer, (2) discovery database, and (3) the rest of the firmware (i.e., consumer of information in the discovery database). Exemplary embodiment can utilize various methods for filtering information to these partitions. In one embodiment, the filtered resources are entirely hidden from item (3) the rest of the firmware. In other words, such resources do not appear in the discovery database even though they were visible to the discovery layer. In another embodiment, the filtered resources are not entirely hidden. In other words, they do appear in the discovery database but they are marked with a flag indicating they are being filtered.

The first filtering method can be utilized when it is desired limit the ability of an array to cooperatively access resources of another array. The second filtering method provides a more granular filtering process in which each algorithm in the rest of the firmware can be customized to cluster use cases.

Embodiments can be applied to various scenarios, such as installing a new cluster, upgrading an existing cluster, adding or removing resources from a cluster, etc.

Figure 3:
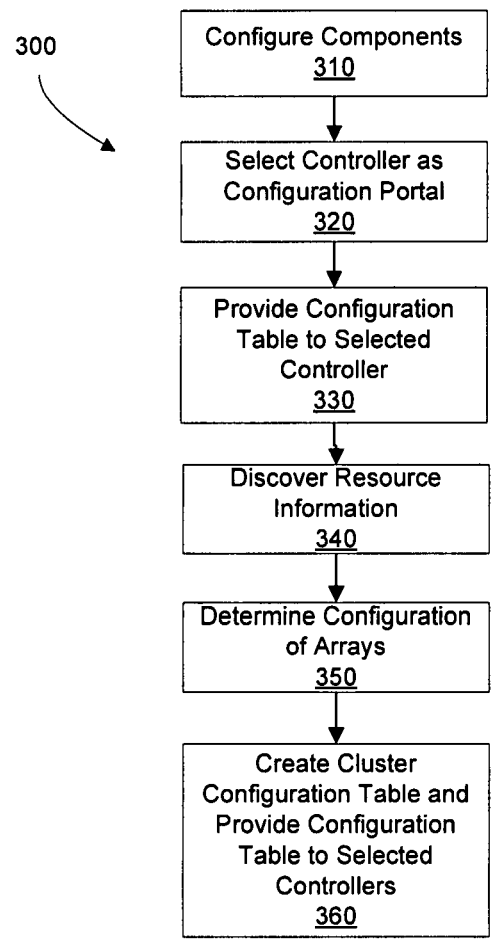
FIG. 3 is a flow diagram for installing a cluster configuration in accordance with an exemplary embodiment of the present invention.

FIG. 3 is a flow diagram 300 for installing a cluster configuration in accordance with an exemplary embodiment of the present invention.

According to block 310, one or more components in the network are configured. For instance, a new installation starts by physically configuring a set of components (controllers, disks, shelves, switches, etc.) that have no existing logical configuration (arrays or clusters) onto a common back end network. By default, there are no cluster configuration tables in place because there are no arrays defined in the logical configuration. As such, if no other mechanism is provided, the default array behavior would occur and confusion would ensue when this configuration was first powered up because all controllers would have visibility to all back end network resources. The cluster configuration layer in firmware has an additional function which detects the condition of being in a physically clustered configuration but without a cluster configuration table and goes into a closed down mode in which no back end network resources are presented by discovery to higher layers of the firmware. The physically clustered configuration is detected by a controller when it sees more than one other controller on the back end network during discovery. When this is detected and there is no cluster configuration table available, the cluster configuration layer enters the closed down mode and forces rediscovery, which results in no resources being presented to the higher layers of firmware. All controllers in a new installation scenario will enter the closed down mode so none of them will present any back end resources to the management software.

One exemplary embodiment allows manual configuration of each controller by the user to indicate the controller is in a clustered configuration. When this setting is detected, the closed mode is entered. Other approaches are also possible.

According to block 320, one or more controllers are selected as a configuration portal. For instance, a user, via the management software, selects one of the controllers as a cluster configuration portal.

According to block 330, a configuration table is provided to the selected controller. Once the controller is selected, the management software provides a cluster configuration table to that one controller, which will make all back end resources visible through that one controller.

According to block 340, the resources in the cluster are discovered. The management software gathers the back end resource information from the controller and presents that information to the user.

According to block 350, a determination is made of the configuration of arrays. For instance, a user uses the discovered information to define the configuration of each array in the cluster. The cluster definition process can be entirely manual by explicit user selection, fully automated by user selection of a cluster configuration policy, or can be some combination of the two. In one embodiment, the cluster configuration is determined entirely by the management software with user input.

According to block 360, a cluster configuration table is created and the configuration table (or portions of the table) is provided to the controllers. Once the cluster configuration is determined, the management software creates the cluster configuration table and communicates it to each of the controllers in the cluster. Upon receipt of the cluster configuration table, the controllers reboot or force rediscovery then array configuration proceeds as if each array were on a separate physical back end network.

Figure 4:
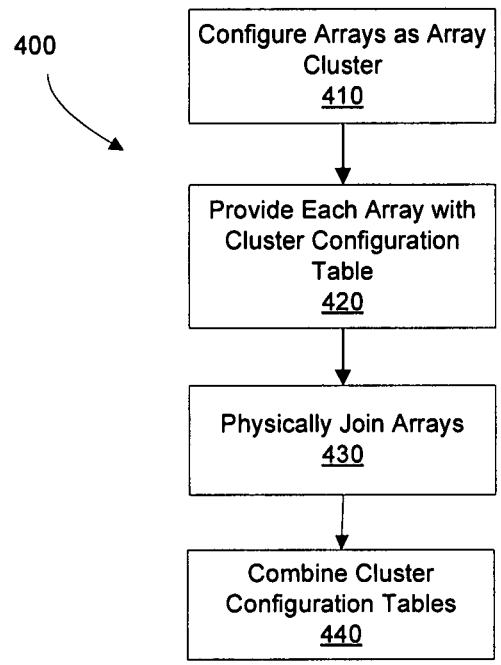
FIG. 4 is a flow diagram for upgrading a cluster configuration in accordance with an exemplary embodiment of the present invention.

FIG. 4 is a flow diagram 400 upgrading a cluster configuration in accordance with an exemplary embodiment of the present invention. The upgrade cluster configuration scenario is useful when it is desired that two or more existing, un-clustered arrays be joined together to form a cluster, preferably without losing the configuration or data of the arrays. If the arrays are physically joined together on one back end network with no prior preparation, the controllers will enter the closed down mode and no back end network resources will be visible. At that point it may be difficult to reconstruct the configuration of the arrays because it would be difficult to identify which resources had been associated with each array prior to joining them on the back end network.

According to block 410, each array is configured as a cluster comprising a single array prior to physically joining the arrays.

According to block 420, each array is provided with a cluster configuration table.

According to block 430, the arrays are physically joined together. After physically joining the arrays into one back end network, the controllers do not go into closed down mode because they have a cluster configuration table. Each controller sees the same set of resources that it saw prior to physically joining the arrays into one back end network and array operation proceeds as if the arrays were on physically separate networks.

According to block 440, the cluster configuration tables for the arrays are combined. For instance, if two arrays are being configured into a cluster, the management software combines the cluster configuration table of the two arrays into a single cluster configuration table and communicates the combined cluster configuration table back down. The upgrade scenario can occur without loss of data availability as long as the process of physically joining the networks does not interrupt access to data.

The upgrade embodiment of FIG. 4 is a specific example of a more general process enabled by exemplary embodiments. A cluster can be split or clusters can be merged by manipulating the cluster configuration table of each array. Splitting and merging are two step processes. First the cluster configuration table in the arrays is established or modified. Then the physical back end network is reconfigured.

Another embodiment adds or removes individual back end resources to an existing cluster. Since each array has a cluster configuration table that restricts its view of back end resources to the current set, new resources added to the back end network are not visible. In this case, the management software sends a request to the cluster configuration portal controller to include any new resources in its view that are not currently contained in the cluster configuration table. This information gives visibility of the new resources to the management software through the cluster configuration portal. The user can choose which array to add the resources to, either manually or by selection of an automatic policy. Once the choice is made, a new cluster configuration table is created and communicated to the arrays, and then the new resources are added into the selected arrays through the normal array management processes.

One aspect of this embodiment is the storage and consistency of the cluster configuration table. The master copy of the cluster configuration table is maintained by management software but firmware also requires access to a copy because it is needed for boot of the storage controllers, before communications with management software has been established. There is also a bootstrapping issue with the firmware copy. If the firmware copy is stored only on disk, then it is difficult to recover in the power up scenario because the table is needed to determine which resources comprise each array in the cluster. If the arrays cannot be formed, then the firmware copy of the cluster configuration table cannot be read from disk. To solve this problem in the normal case, this approach also includes a copy of the cluster configuration table to be stored in controller NVRAM (nonvolatile random access memory). Then during boot with intact NVRAM, the arrays can be formed before disk access begins and boot proceeds as in the case of arrays on separate physical back end networks. Introducing the requirement for NVRAM storage of the cluster configuration table violates the goal of maintaining the stateless characteristic of the controller design so a back up boot process exists that does not depend on the NVRAM copy.

In one embodiment, the purpose of the NVRAM copy is to expedite boot in the normal case but it is not necessary for correctness. The back-up boot process is to attempt to fetch a copy of the cluster configuration table from another controller which still has it in NVRAM or for one array in the cluster to serially boot every copy of array definition metadata in the cluster far enough to recover a valid copy of the table then boot again with the correct table. The management software maintains the master copy of the cluster configuration table redundantly in a storage area allocated for that purpose. Various transactional methods are used to maintain consistency among all the copies of the table.

Exemplary embodiments provide a clustered storage architecture that is implemented without extensive modification of existing array controller firmware algorithms. The additional cost and other undesirable constraints of a network capable of zoning are avoided.

Figure 5:
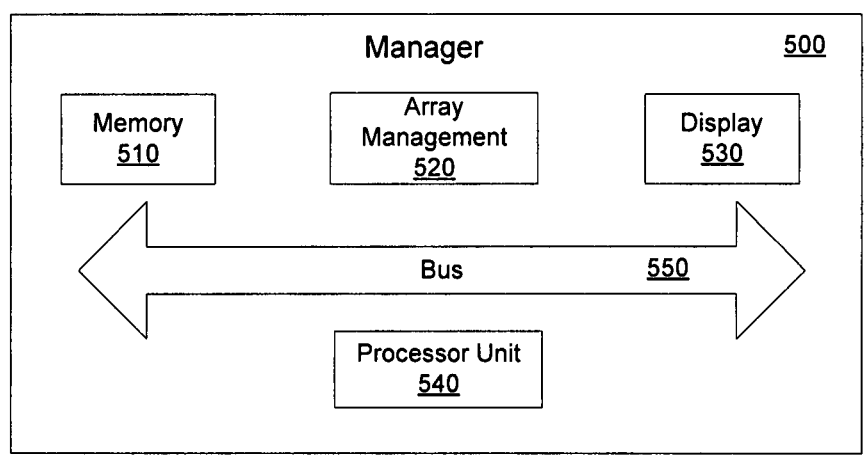
FIG. 5 is a block diagram of a manager in accordance with an exemplary embodiment of the present invention.

FIG. 5 is a block diagram of a manager 500 in accordance with an exemplary embodiment of the present invention. In one embodiment, the manager is a computer that includes memory 510, array management software or algorithms 520, display 530, processing unit 540 and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The memory 510, for example, stores applications, data, programs, algorithms (including software to implement or assist in implementing embodiments in accordance with the present invention) and other data. The processing unit 540 communicates with memory 510 and display 530 via one or more buses 550.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
discovering storage resources for arrays in a cluster storage system, wherein the arrays include respective storage controllers, and the storage controllers are to handle data requests received from host devices over a network;
filtering the storage resources to define ownership of the storage resources among the arrays;
providing the filtered storage resources to the arrays so each array in the cluster storage system receives information associated with a different portion of the storage resources;
hiding a portion of the storage resources from each of the arrays such that storage resources not assigned to a given array are hidden and not visible to firmware of the storage controller of the given array;
determining, by a given one of the storage controllers, whether a configuration table exists; and
in response to determining that the configuration table does not exist, performing, by the given storage controller, the discovering, the filtering, and creating of the configuration table that defines which of the storage resources are visible to the respective arrays and which of the storage resources are hidden from the respective arrays.

2. The method of claim 1 further comprising, using a layer in firmware of the storage controller in a particular array to probe a backend network to discover the storage resources in the cluster storage system.

3. The method of claim 1, wherein the storage resources of the arrays are contained in their own network zones to limit visibility of the storage resources to the storage controllers in the arrays.

4. The method of claim 1, wherein the storage resources include disks and disk arrays.

5. The method of claim 1 further comprising:
providing a first of the arrays with a first list of storage resources managed by the first array;
providing a second of the arrays with a second list of storage resources managed by the second array, wherein the first array is not provided with the second list and the second array is not provided with the first list.

6. The method of claim 1 further comprising:
providing a table with a list of all storage resources discovered, wherein the list determines which of the storage resources each of first and second arrays see in the cluster storage system;
flagging storage resources in the list to identify which storage resources do not belong to the first array and which storage resources do not belong to the second array.

7. A non-transitory computer-readable storage medium storing instructions that upon execution cause a computer to:
select a given controller to be a configuration portal for installing a new cluster in a storage system that includes a first array and a second array, wherein each of the first and second arrays includes a respective storage controller, and the storage controllers are to handle data requests received from host devices over a network;
discover storage resources via the given controller;
create a table that assigns ownership of the storage resources to the first and second arrays in the cluster, wherein the table determines which of the storage resources each of the first and second arrays sees such that storage resources in the table not assigned to the first array but assigned to the second array are hidden and not visible to firmware of the storage controller of the first array, wherein the table has a plurality of entries, where a first of the entries includes a name of the first array and one or more identifiers of one or more storage resources that are visible to the first array, and a second of the entries includes a name of the second array and one or more identifiers of one or more storage resources that are visible to the second array.

8. The computer-readable storage medium of claim 7, wherein the instructions upon execution cause the computer to further configure storage controllers and disks that have no existing logical configuration onto a backend network as part of installing the new cluster.

9. The computer-readable storage medium of claim 7, wherein the instructions upon execution cause the computer to further provide each of the first and second arrays in the cluster with management of only a portion of the discovered storage resources.

10. The computer-readable storage medium of claim 7, wherein the instructions upon execution cause the computer to further receive input from a user for determining how to divide management of the storage resources among the first and second arrays in the cluster.

11. The computer-readable storage medium of claim 7, wherein the instructions upon execution cause the computer to further detect a physical cluster configuration via the given controller.

12. The computer-readable storage medium of claim 7, wherein the instructions upon execution cause the computer to further provide the given controller with a cluster configuration table to make backend resources visible to the given controller.

13. The computer-readable storage medium of claim 7, wherein the instructions upon execution cause the computer to further gather backend resources discovered by the given controller and present the backend resources to a user.

14. A method, comprising:
discovering, with a layer in firmware of a controller in an array, storage resources for arrays in a cluster storage system, wherein the arrays include respective controllers, and the controllers are to handle data requests received from host devices over a network;
generating a table to define how ownership of the storage resources are divided among the arrays, wherein the table determines which of the storage resources each of the arrays sees such that storage resources in the table not assigned to a first array but assigned to a second array are hidden and not visible to firmware of the controller of the first array, wherein the table has a plurality of entries, where a first of the entries includes a name of the first array and one or more identifiers of one or more storage resources that are visible to the first array, and a second of the entries includes a name of the second array and one or more identifiers of one or more storage resources that are visible to the second array; and providing the table to the arrays so each array can identify which storage resources to manage.

15. The method of claim 14, wherein each array functions as being physically isolated from other arrays in the cluster storage system.

16. The method of claim 14, wherein new storage resources added to the cluster storage system are visible to only some of the arrays.

17. A method, comprising:

discovering storage resources for arrays in a cluster storage system, wherein the arrays include respective storage controllers, and the storage controllers are to handle data requests received from host devices over a network;

filtering the storage resources to define ownership of the storage resources among the arrays;

providing the filtered storage resources to the arrays so each array in the cluster storage system receives information associated with a different portion of the storage resources;

hiding a portion of the storage resources from each of the arrays such that storage resources not assigned to a given array are hidden and not visible to firmware of the storage controller of the given array;

generating a table of the storage resources discovered in the cluster storage system, wherein the table has a plurality of entries, and wherein each of the plurality of entries includes a name of a corresponding one of the arrays and one or more identifiers of one or more storage resources that are visible to the corresponding array;

defining the ownership of the storage resources in the table; and providing only a portion of the table to the corresponding storage controller in each of the arrays.

18. A non-transitory computer-readable storage medium storing instructions that upon execution cause a computer to:

select a given controller to be a configuration portal for installing a new cluster in a storage system that includes a first array and a second array, wherein each of the first and second arrays includes a respective storage controller, and the storage controllers are to handle data requests received from host devices over a network;

discover storage resources via the given controller;

create a table that assigns ownership of the storage resources to the first and second arrays in the cluster, wherein the table determines which of the storage resources each of the first and second arrays sees such that storage resources in the table not assigned to the first array but assigned to the second array are hidden and not visible to firmware of the storage controller of the first array;

determine whether the table exists; and in response to determining that the table does not exist, perform the discovering and the creating.

* * * * *